(12) United States Patent
Wang et al.

(10) Patent No.: US 8,553,145 B2
(45) Date of Patent: Oct. 8, 2013

(54) METHOD AND RELATED APPARATUS FOR IMAGE DE-INTERLACING

(75) Inventors: Yu-Jen Wang, Taipei (TW); Yu-Sen Lin, Tai-Chung (TW); Scott Jen, Hsin-Chu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1514 days.

(21) Appl. No.: 11/968,658

(22) Filed: Jan. 3, 2008

(65) Prior Publication Data
US 2008/0211960 A1 Sep. 4, 2008

Related U.S. Application Data

(60) Provisional application No. 60/886,657, filed on Jan. 26, 2007.

(51) Int. Cl.
*H04N 7/01* (2006.01)
*H04N 11/20* (2006.01)

(52) U.S. Cl.
USPC .......... 348/448; 348/441; 348/442; 348/443; 348/444; 348/446; 348/447; 348/450; 348/451; 348/452

(58) Field of Classification Search
USPC ................................. 348/441–448, 451–452
See application file for complete search history.

(56) References Cited

U.S. PATENT DOCUMENTS

| 6,144,412 | A | * | 11/2000 | Hirano et al. | 348/441 |
| 6,801,221 | B2 | * | 10/2004 | Kawamura et al. | 345/698 |
| 2004/0207753 | A1 | | 10/2004 | Jung | |
| 2004/0263685 | A1 | * | 12/2004 | Song | 348/452 |
| 2005/0078214 | A1 | * | 4/2005 | Wong et al. | 348/452 |
| 2007/0153123 | A1 | * | 7/2007 | Pan et al. | 348/452 |

FOREIGN PATENT DOCUMENTS

| CN | 1477869 A | 2/2004 |
| TW | 270268 | 2/1996 |
| TW | 326612 | 2/1998 |
| TW | 554626 | 9/2003 |
| TW | 591940 | 6/2004 |

* cited by examiner

*Primary Examiner* — Pankaj Kumar
*Assistant Examiner* — Alazar Tilahun
(74) *Attorney, Agent, or Firm* — Winston Hsu; Scott Margo

(57) ABSTRACT

An image de-interlacing method comprises: (a) defining a first threshold value and a second threshold value, wherein the second threshold value is larger than the first threshold value; (b) generating a parameter according to motion level of a interlaced image; and (c) utilizing a first interpolation method and a second interpolation method to jointly process the interlaced image if the parameter is in a range between the first threshold value and the second threshold value.

3 Claims, 5 Drawing Sheets

METHOD AND RELATED APPARATUS FOR IMAGE DE-INTERLACING

CROSS REFERENCE TO RELATED APPLICATIONS

This application claims the provisional application, which is U.S. Provisional Application No. 60/886,657, filed 2007, Jan. 26, and is included herein by reference.

BACKGROUND OF THE INVENTION

1. Field of the Invention

The present invention relates to a method and related apparatus for de-interlacing an interlaced image, and particularly relates to a method and related apparatus for de-interlacing an interlaced image utilizing at least two interpolation methods.

2. Description of the Prior Art

A television can display 60 continuous frames under the standard of NTSC. There are limitations for bandwidth transmission or storage capacitance when an image signal is transmitted via a TV station or stored to a storage media, and the display has limitations in scanning frequency as well. In order to avoid these limitations, interlaced scanning is utilized to take each frame of image signal apart to generate interlaced images, such that the amount of data decreases. Each frame of the interlaced image has only half of an original frame, however, so an image interpolation method is needed to generate missing pixels in each frame; that is, image de-interlacing is performed.

Bob mode is one of the popular image interpolation methods, which performs interpolation according to pixels at the same column (i.e, in the vertical direction) with the pixel to be interpolated. However, Bob mode is only suitable for an image with more dynamic components (that is, an image closer to a dynamic image), and flicker may occur if the Bob mode is utilized for images with more static components.

Ideally, images can be broken into parts that are identified as dynamic images or static images by utilizing motion detection, such that another image interpolation method can be utilized to process static images and the Bob mode can be utilized to process dynamic images. However, a motion detection method that is 100% correct does not exist, thus the above-mentioned method has disadvantages.

Therefore, a new method or apparatus is needed to solve above-mentioned problems.

SUMMARY OF THE INVENTION

One objective of the present invention is to provide an image de-interlacing method, which utilizes different interpolation methods to process an interlaced image for de-interlacing according to a motion level of the image.

One embodiment of the present invention discloses an image de-interlacing method, which comprises steps of: (a) defining a first threshold value and a second threshold value, where in the second threshold value is larger than the first threshold value; (b) generating a parameter according to a motion level of a interlaced image; and (c) utilizing a first interpolation method and a second interpolation method to jointly process the interlaced image if the parameter is in a range between the first threshold value and the second threshold value.

Another embodiment of the present invention discloses an image de-interlacing apparatus, comprising: a parameter detector, for detecting a motion level of a interlaced image to generate a parameter; a controlling circuit, coupled to the parameter detector, for processing the interlaced image to generate a de-interlaced image, wherein the controlling circuit utilizes a first interpolation method and a second interpolation method to jointly process the interlaced image if the parameter is in a range between the first threshold value and the second threshold value.

One example of the above-mentioned first interpolation method is Median mode, and one example of the above-mentioned second interpolation method is Bob mode.

According to above-mentioned method and system, suitable interpolation method can be utilized according to the motion level of the image. In addition, an improved Median mode is utilized to modify the disadvantages of a traditional Median mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
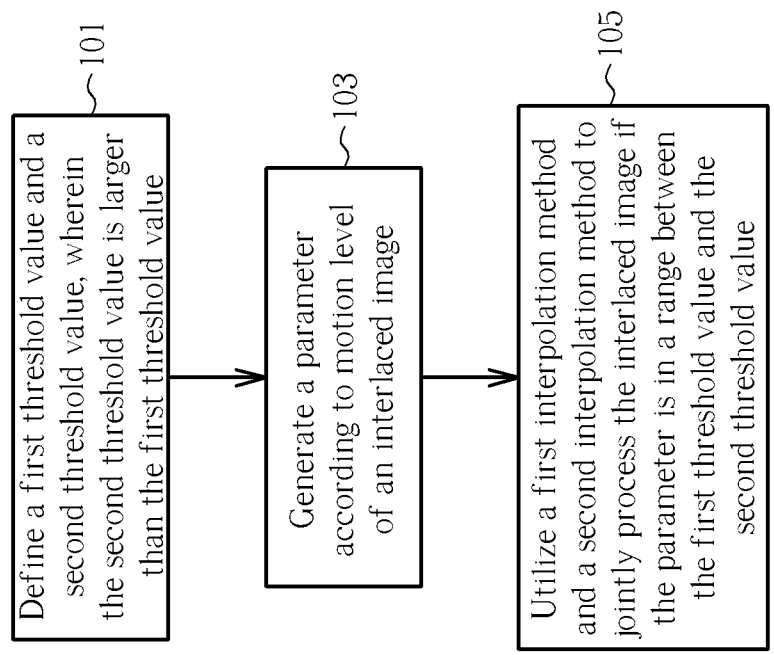
FIG. 1 is a flowchart illustrating an image de-interlacing method according to an embodiment of the present invention.

FIG. 1 is a flowchart illustrating an image de-interlacing method according to an embodiment of the present invention. As shown in FIG. 1, the image de-interlacing method comprises:

Step 101: Define a first threshold value and a second threshold value, wherein the second threshold value is larger than the first threshold value.

Step 103: Generate a parameter according to motion level of an interlaced image.

Step 105: Utilize a first interpolation method and a second interpolation method to jointly process the interlaced image if the parameter is in a range between the first threshold value and the second threshold value.

The method shown in FIG. 1 can further comprise: utilize the first interpolation method to process the image if the parameter is lower than the first threshold value, and utilize the second interpolation method to process the image if the parameter is over the second threshold value. This is not meant, however, to limit the present invention. For example, a variation utilizing a third interpolation method (and not the first and second interpolation methods) to process image when the parameter is lower than the first threshold value should also fall in the scope of the present invention. Additionally, the method shown in FIG. 1 can determine the blending ratio of the first interpolation method and the second interpolation method according to the parameter.

Figure 2:
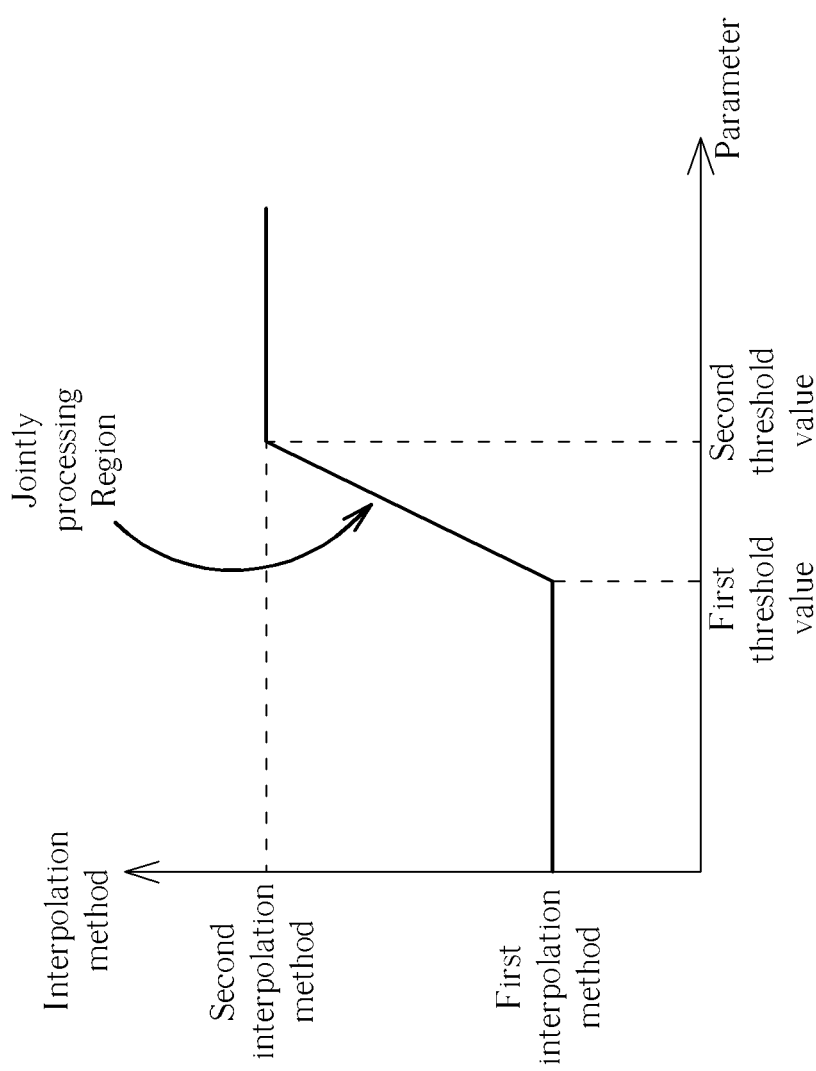
FIG. 2 is a schematic diagram illustrating the image de-interlacing method shown in FIG. 1.

FIG. 2 is a schematic diagram illustrating the image de-interlacing method shown in FIG. 1. As shown in FIG. 2, the horizontal axis is relative to a motion level of the image, which will be described below, and the vertical axis is the interpolation method. As shown in FIG. 2, a first interpolation method and a second interpolation method are jointly utilized to process an interlaced image if the parameter is in a range between the first and the second threshold values, and the blending ratio of the first interpolation method and the second interpolation method is different according to the parameter. The first interpolation method is utilized to process the image if the parameter is lower than the first threshold value, while the second interpolation method is utilized to process the image if the parameter is over the second threshold value.

Figure 3:
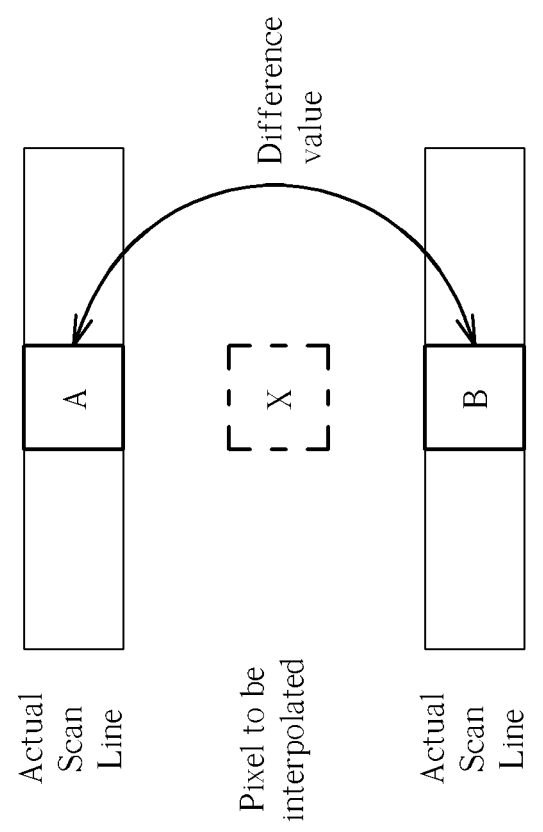
FIG. 3 is a schematic diagram for computing the parameter.

FIG. 3 is a schematic diagram for computing the parameter relative to the motion level of the image. In this embodiment, the parameter is a vertical frequency, which is computed based on the difference between the pixels A and B on the corresponding locations of the previous and next scan line, wherein the corresponding locations correspond to the location of the target pixel X to be interpolated, as shown in FIG. 3. The larger the difference, the larger the vertical frequency is. It should be noted that, although the vertical frequency is utilized to indicate the dynamic and static level of the image in this embodiment, it is not meant to be a limit to the scope of the present invention. As known by persons skilled in the art, other parameters can be obtained via other motion detection methods to replace the vertical frequency to reach the same function of the present invention, and should also fall in the scope of the present invention.

Figure 4:
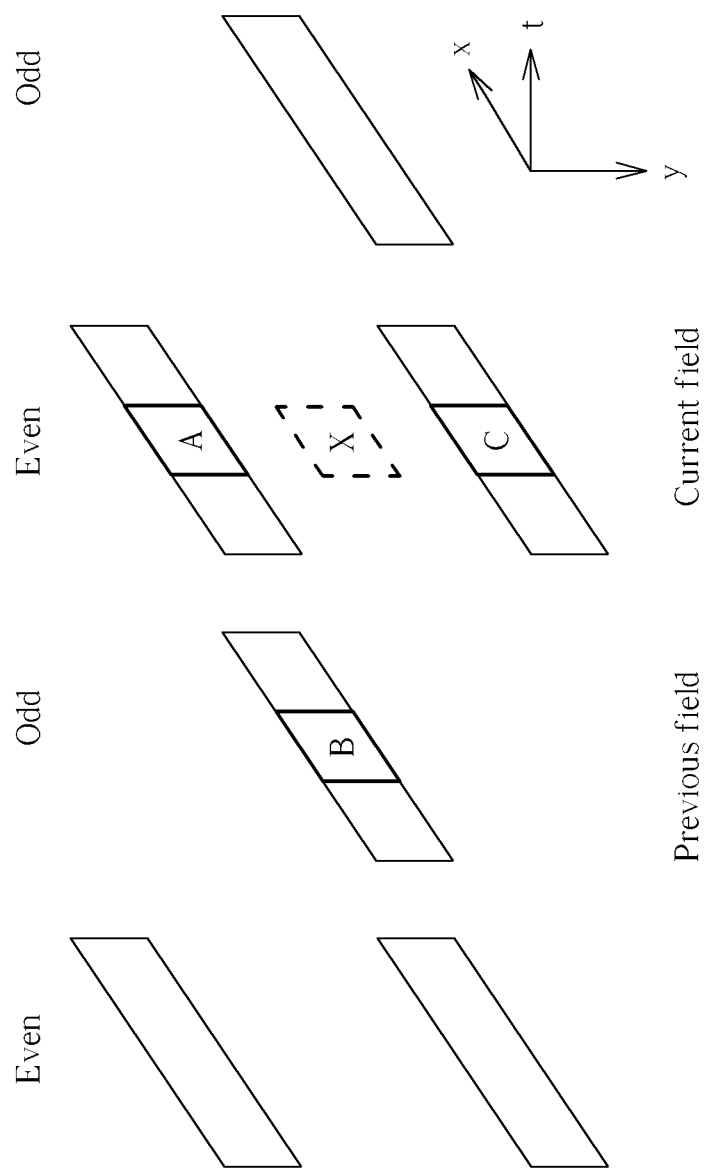
FIG. 4 is a schematic diagram illustrating an interpolation method of adaptive Median mode.

In the embodiment shown in FIG. 2, the first interpolation method is utilized for processing an image with more static components, and the second interpolation method is utilized for processing an image with more dynamic components. Also, according to one embodiment, the first interpolation method is an adaptive Median mode, and the second interpolation method is a Bob mode. Bob mode computes the parameter according to the difference between pixels in a vertical direction in a field of the interlaced image. FIG. 4 is a schematic diagram illustrating an interpolation method of adaptive Median mode. As shown in FIG. 4, in the adaptive Median mode the target pixel X is not only determined according to the pixels A and C respectively under and above the target pixel X in the same field, but also according to a corresponding pixel B in another field (the previous field in this embodiment).

A computing equation of a traditional Median mode can be shown as X=median (A, B, C), that is, a median value of A, B, C is utilized as a value of the target pixel X. However, such method may cause distortion of a frame. Thus, the present invention not only utilizes a traditional Median mode, but also provides an improved Median mode (adaptive Median mode), which can be shown in the following equation:

$X = \text{median}(A,B,C)$;

If (X==B)
X=B;
else $X = (A+C)/2$

That is, a value of the target pixel X is first computed according to the traditional Median mode, and the target pixel X value is set to the value of the pixel B if the target pixel X value equals to the value of the pixel B, which is at a corresponding location in another field (a previous field in this embodiment). If the target pixel X value does not equal to that of B, then the value of X is computed according to A and C in the same field. In this embodiment, an average value of A and C are utilized as a value of X, but this is not intended as a limitation to the scope of the present invention. For example, ⅓ times of the summing of A and C can be utilized as the value of X.

Figure 5:
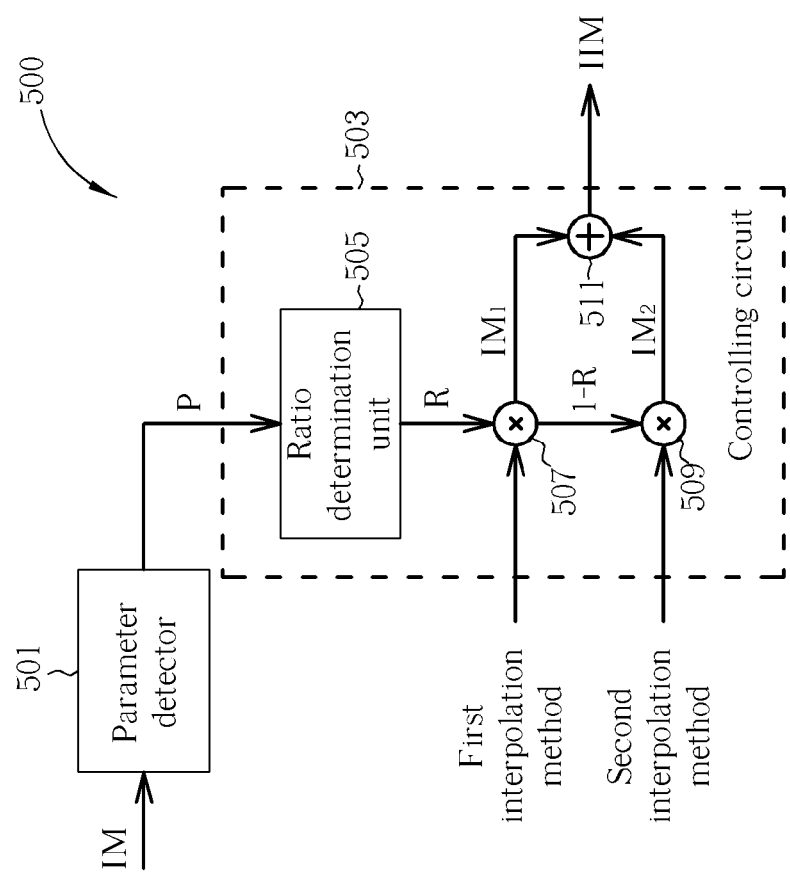
FIG. 5 is a functional block diagram illustrating an image de-interlacing apparatus according to an embodiment of the present invention.

FIG. 5 is a functional block diagram illustrating an image de-interlacing apparatus 500 according to an embodiment of the present invention. As shown in FIG. 5, the image de-interlacing apparatus 500 includes a parameter detector 501 and a controlling circuit 503. The parameter detector 501 is used for detecting a motion level of an interlaced image to generate a parameter. The controlling circuit 503, which is coupled to the parameter detector 501, is used for processing an image IM (an interlaced image) to generate an interpolated image IIM (a de-interlaced image), wherein the controlling circuit 503 utilizes a first interpolation method and a second interpolation method to jointly process the image IM if the parameter is in the range between the first threshold value and the second threshold value. As mentioned above, the controlling circuit 503 can utilize the first interpolation method to process the image IM if the parameter is lower than the first threshold value, and utilize the second interpolation method to process the image IM if the parameter is over the second threshold value. In one embodiment, the first interpolation method is utilized for processing image with more static components, and the second interpolation method is utilized for processing image with more dynamic components. The first interpolation method can be the Median mode, and the second interpolation method can be the Bob mode, as described above. Also, the first interpolation method can be an adaptive Median mode as mentioned.

According to an embodiment of the present invention, the controlling circuit 503 can comprise a ratio determination unit 505, computing units 507 and 509, and a combination unit 511. In this embodiment, the computing units 507 and 509 are multipliers, and the combination unit 511 is an adder, but it is not meant to limit the scope of the present invention. The ratio determination unit 505 can determine a ratio R, which can be regarded as a weight value according to the parameter P. The computing unit 507, which is coupled to the ratio determination unit 505, is utilized for processing the image IM to generate a first image $IM_1$ according to the ratio R and the first interpolation method. The computing unit 509 is used for processing the image IM to generate a second image $IM_2$ according to 1-R and the second interpolation method. The combination unit 511 is used for combining the first image $IM_1$ and the second image $IM_2$ to generate the interpolated image IIM.

Other detail characteristics such as the method for generating parameter P, the traditional Median mode and the adaptive Median mode are already disclosed in above-mentioned method, thus it is omitted for brevity here.

According to above-mentioned method and system, suitable interpolation methods can be utilized according to the motion level of the image. Additionally, an improved Median mode is utilized to modify the disadvantages of a traditional Median mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An image de-interlacing method, comprising steps of:
   (a) defining a first threshold value and a second threshold value, wherein the second threshold value is larger than the first threshold value;
   (b) generating a parameter according to a motion level of a interlaced image, wherein the parameter is computed according to a difference between pixels in a vertical direction in a field of the interlaced image;

(c) utilizing a first interpolation method and a second interpolation method to jointly process the interlaced image if the parameter is in a range between the first threshold value and the second threshold value; and (d) utilizing the first interpolation method to process the interlaced image if the parameter is lower than the first threshold value, and utilizing the second interpolation method to process the interlaced image if the parameter is over the second threshold value, wherein a ratio between the first interpolation method and the second interpolation method to process the interlaced image is determined according to the parameter;

where the first interpolation method is utilized for processing an interlaced image with more static components, and the second interpolation method is utilized for processing an interlaced image with more dynamic components.

2. The method of claim 1, wherein the first interpolation method is Median mode.

3. An image de-interlacing apparatus, comprising:
a parameter detector, for detecting a motion level of an interlaced image to generate a parameter, wherein the parameter detector computes the parameter according to a difference between pixels on a vertical direction in a field of the interlaced image;
a controlling circuit, coupled to the parameter detector, for processing the interlaced image to generate a de-interlaced image, wherein the controlling circuit utilizes a first interpolation method and a second interpolation method to jointly process the interlaced image if the parameter is in a range between the first threshold value and the second threshold value and utilizes the first interpolation method to process the image if the parameter is lower than the first threshold value, and utilizing the second interpolation method to process the image if the parameter is over the second threshold value, wherein the controlling circuit comprises:
a ratio determination unit, for determining a ratio according to the parameter;
a first computing unit, coupled to the ratio determination unit, for processing the interlaced image to generate a first image according to the ratio and the first interpolation method;
a second computing unit, for processing the interlaced image to generate a second image according to a value of one minus the ratio and the second interpolation method; and
a combination unit, for combining the first image and the second image to generate the de-interlaced image;
wherein the first interpolation method is utilized for processing the interlaced image with more static components, and the second interpolation method is utilized for processing the interlaced image with more dynamic components.

* * * * *